United States Patent
Ardanese et al.

(10) Patent No.: US 9,909,482 B2
(45) Date of Patent: Mar. 6, 2018

(54) SYSTEM AND METHOD FOR VEHICLE OXIDATION CATALYST MONITORING

(71) Applicant: GM GLOBAL TECHNOLOGY OPERATIONS LLC, Detroit, MI (US)

(72) Inventors: Michelangelo Ardanese, Berkley, MI (US); David Edwards, Rochester Hills, MI (US); Charles E. Dean, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 72 days.

(21) Appl. No.: 15/212,307

(22) Filed: Jul. 18, 2016

(65) Prior Publication Data

US 2018/0016962 A1    Jan. 18, 2018

(51) Int. Cl.
*F01N 3/00* (2006.01)
*F01N 11/00* (2006.01)
*F01N 3/023* (2006.01)
*F01N 9/00* (2006.01)
*F01N 3/20* (2006.01)

(52) U.S. Cl.
CPC ........... *F01N 11/002* (2013.01); *F01N 3/023* (2013.01); *F01N 3/2066* (2013.01); *F01N 9/002* (2013.01)

(58) Field of Classification Search
USPC ......... 60/274, 276, 277, 286, 295, 299, 300, 60/303
See application file for complete search history.

(56) References Cited

U.S. PATENT DOCUMENTS

| | | | |
|---|---|---|---|
| 8,490,388 B2* | 7/2013 | Parmentier | F01N 3/103 60/286 |
| 8,549,839 B2* | 10/2013 | Barasa | F01N 3/035 60/285 |
| 2005/0252198 A1* | 11/2005 | Okugawa | F02D 41/0245 60/284 |
| 2007/0289287 A1* | 12/2007 | Tahara | F01N 3/0231 60/277 |
| 2012/0203434 A1* | 8/2012 | Sujan | B60W 50/14 701/64 |
| 2013/0298526 A1* | 11/2013 | Wang | F02D 41/029 60/274 |

\* cited by examiner

*Primary Examiner* — Binh Q Tran
(74) *Attorney, Agent, or Firm* — Quinn IP Law

(57) ABSTRACT

A system and method for evaluating the efficiency of an oxidation catalyst of a vehicle exhaust system includes a diagnostic control system including a controller operatively connected to the exhaust system and at least one temperature sensor disposed proximate the oxidation catalyst to measure the temperature of the exhaust gas. The controller determines an operating state of at least one of the engine and exhaust system and initiates a particulate filter regeneration process in response to the detected operating state. The controller defines a first diagnostic index value and calculates a second diagnostic index value based upon the first diagnostic index value and an offset value. An oxidation catalyst efficiency validation module determines the efficiency of the oxidation catalyst.

20 Claims, 3 Drawing Sheets

SYSTEM AND METHOD FOR VEHICLE OXIDATION CATALYST MONITORING

TECHNICAL FIELD

The present disclosure relates to a system and method for vehicle oxidation catalyst monitoring.

BACKGROUND

Internal combustion engines generally include an exhaust after-treatment device, such as diesel particulate filters, three-way catalysts, and the like. The exhaust after-treatment devices have been developed to effectively limit exhaust emissions from an internal combustion engine. In the case of compression-ignition or diesel engines, a great deal of effort continues to be expended to develop practical and efficient devices and methods for reducing emissions of largely carbonaceous particulates in exhaust gases. An oxidation catalyst is one of the devices that are often provided in diesel engines for such a purpose.

Typical exhaust systems incorporate an oxidation catalyst to reduce emissions from diesel engine. The oxidation catalyst oxidizes hydrocarbons (HC) and carbon monoxides (CO) that are formed in the combustion process of the engine. During its operative life, oxidation catalysts gradually reduce in efficiency. Diagnostic systems incorporated in a vehicle may be used to determine the efficiency index of the oxidation catalyst during an exhaust system regeneration process. However, the diagnostic system may be unable to differentiate whether an oxidation catalyst is operating below normal operating parameters during the regeneration process.

SUMMARY

A system and method for evaluating the efficiency of an oxidation catalyst of a vehicle exhaust system includes a diagnostic control system including a controller operatively connected to the exhaust system and at least one temperature sensor disposed proximate the oxidation catalyst to measure the temperature of the exhaust gas. The exhaust system is in fluid communication with an exhaust port of the engine and treats the exhaust gas. The exhaust system includes an oxidation catalyst and a particulate filter, wherein the particulate filter is configured to regenerate when the exhaust gas is heated above a regeneration temperature.

The diagnostic control system including the controller is operable to determine an operating state of at least one of the engine and exhaust system and initiate a particulate filter regeneration process in response to the detected operating state. A first diagnostic index value is defined by calculating a ratio of a heat release value to an amount of post injection fuel released in a time period of the particulate filter regeneration process.

The controller identifies an offset value based upon temperature of the exhaust gas in the particulate filter regeneration process time period with the at least one temperature sensor and defines a second diagnostic index value by calculating a ratio of the first diagnostic index value and the offset value. An oxidation catalyst efficiency validation module of the controller of the diagnostic control system evaluates the second diagnostic index value to determine the efficiency of the oxidation catalyst.

The at least one temperature sensor further comprises a first temperature sensor disposed proximate an inlet of the oxidation catalyst configured to measure the exhaust gas temperature upstream of the oxidation catalyst and a second temperature sensor disposed proximate an outlet of the oxidation catalyst configured to measure the exhaust gas temperature downstream of the oxidation catalyst. The controller of the diagnostic control system is operable to calculate the heat release value by determining one or more parameters of the oxidation catalyst, determining an exhaust gas mass flow rate into the oxidation catalyst, calculating a catalyst value from the product of the exhaust gas mass flow rate and the difference between the exhaust gas temperature downstream of the oxidation catalyst and an inert temperature, and integrating the catalyst value to determine the heat release value.

The controller evaluates an inert catalyst temperature model to determine the inert temperature used to calculate the specific heat value of the oxidation catalyst. The controller integrates the catalyst value wherein a lower limit of the time interval is a first time at which exhaust gas downstream of the oxidation catalyst reaches a first temperature, and an upper limit of the time interval is a second time at which exhaust gas downstream of the oxidation catalyst reaches a second temperature that is higher than the first temperature.

The oxidation catalyst efficiency validation module of the controller is configured to compare the second diagnostic index value with at least one of a preset threshold worst possible acceptable (WPA) value and preset threshold best possible unacceptable (BPU) value. The controller of the diagnostic control system is operable to identify whether the oxidation catalyst is considered faulty when the second diagnostic index value is below preset threshold best possible unacceptable (BPU) value.

The diagnostic control system initiates the particulate filter regeneration process when the exhaust gas temperature at the inlet of the oxidation catalyst is measured between about 200 degrees Celsius and about 350 degrees Celsius. The exhaust system further comprises a selective catalytic reduction catalyst.

In another embodiment of the disclosure, a method for use aboard a vehicle having an engine generating an exhaust gas, an exhaust system in fluid communication with the engine including an oxidation catalyst and a particulate filter and a diagnostic control system including a controller and at least one temperature sensor disposed proximate the oxidation catalyst in communication with the controller. The method comprises using the controller to determine an operating state of at least one of the engine and exhaust system and initiating a particulate filter regeneration process in response to the detected operating state.

The controller calculates a heat release value to an amount of post injection fuel released in a time period of the particulate filter regeneration process to define a first diagnostic index value and determines an offset value based upon temperature of the exhaust gas in the particulate filter regeneration process time period measured with the at least one temperature sensor. The controller calculates a ratio of the first diagnostic index value and the offset value to define a second diagnostic index value and uses an oxidation catalyst efficiency validation module to evaluate the second diagnostic index value to determine the efficiency of the oxidation catalyst.

The at least one temperature sensor further comprises a first temperature sensor disposed proximate an inlet of the oxidation catalyst configured to measure the exhaust gas temperature upstream of the oxidation catalyst and a second temperature sensor disposed proximate an outlet of the oxidation catalyst configured to measure the exhaust gas temperature downstream of the oxidation catalyst. The step of calculating the heat release value for the first diagnostic index value further comprises determining one or more parameters of the oxidation catalyst, determining an exhaust gas mass flow rate into the oxidation catalyst, calculating a catalyst value from the product of the exhaust gas mass flow rate and the difference between the exhaust gas temperature downstream of the oxidation catalyst and an inert temperature and integrating the catalyst value to determine the heat release value.

The controller evaluates an inert catalyst temperature model to determine the inert temperature used to calculate the specific heat value of the oxidation catalyst. The step of using the oxidation catalyst efficiency validation module of the controller further comprises comparing the second diagnostic index value with at least one of a preset threshold worst possible acceptable (WPA) value and preset threshold best possible unacceptable (BPU) value.

The oxidation catalyst is considered faulty when the second diagnostic index value is below the preset threshold best possible unacceptable (BPU) value. The controller initiates the particulate filter regeneration process when the exhaust gas temperature at the inlet of the oxidation catalyst is measured between about 200 degrees Celsius and about 350 degrees Celsius.

The above features and advantages and other features and advantages of the present disclosure are readily apparent from the following detailed description of the best modes for carrying out the disclosure when taken in connection with the accompanying drawings.

DESCRIPTION

Figure 1:
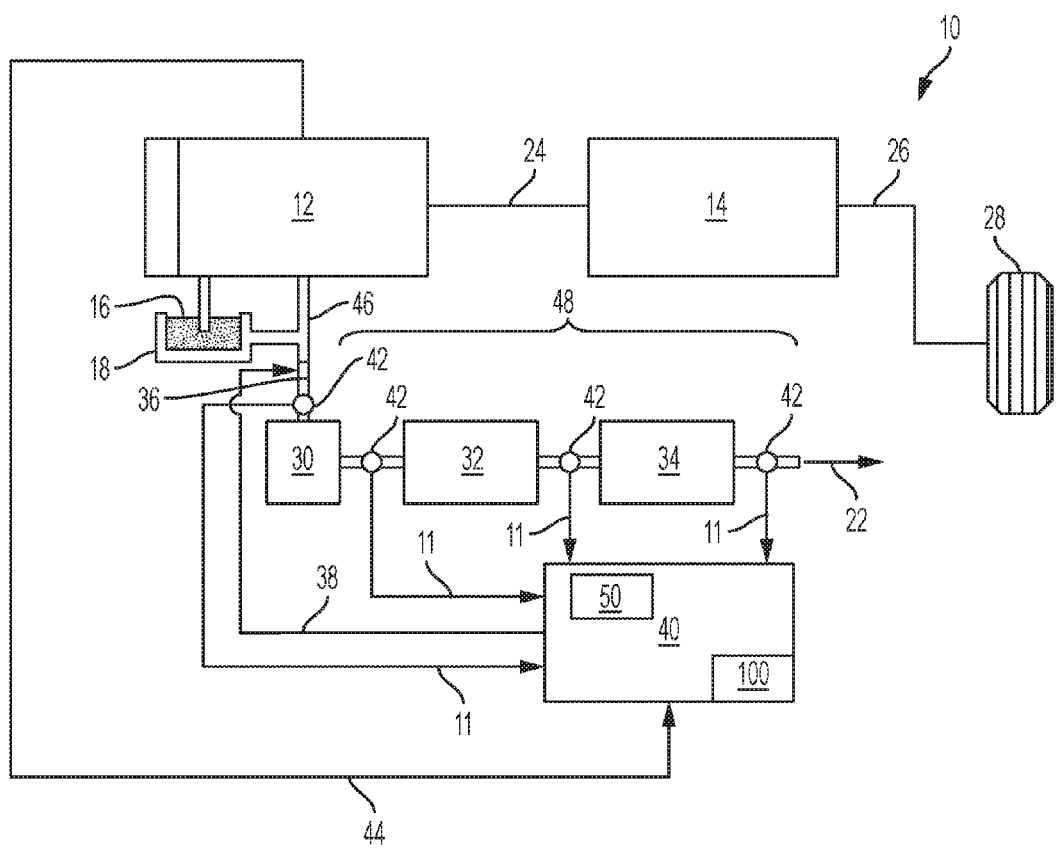
FIG. 1 is a schematic illustration of a vehicle having an internal combustion engine and an oxidation catalyst system.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring to the drawings, wherein like reference numbers correspond to like or similar components throughout the several Figures, a vehicle 10 is shown schematically in FIG. 1. The vehicle 10 may include a motorized vehicle, such as, but not limited to, standard passenger cars, sport utility vehicles, light trucks, heavy duty vehicles, minivans, buses, transit vehicles, bicycles, robots, farm implements, sports-related equipment or any other transportation device. Vehicle 10 includes a diagnostic control system or diagnostic algorithm 100 including a controller 40.

Controller 40 may control overall operation of the engine control system and is thus operable for calculating, evaluating, and controlling actual hydrocarbon levels ultimately discharged from the vehicle 10 into the surrounding atmosphere. Controller 40 may implement the use of an inert temperature model 50 to calculate one or more catalyst parameters, such as hydrocarbon levels. The controller 40 also may be configured to perform a plurality of engine system diagnostics and control engine system operations based upon various vehicle parameters including, but not limited to, driver input, stability control and the like. The controller may be implemented in an engine control module (ECM), a vehicle computer, or may be an independent controller.

Vehicle 10 includes an internal combustion engine 12, such as a diesel engine or a direct injection gasoline engine, the exhaust system 48, and a transmission 14. Engine 12 combusts a specific amount of ambient air flow mixed with a metered amount of fuel 16 drawn from a fuel tank 18. In one possible embodiment, the fuel 16 is diesel fuel, although other fuel types may be used depending on the design of the engine 12. It is understood that the vehicle 10 may include one or more exhaust systems 48.

Combustion of fuel 16 generates an exhaust gas stream or flow 22, which is ultimately discharged from vehicle 10 into the surrounding ambient atmosphere. Energy released by the combustion of fuel 16 produces torque on an input member 24 of the transmission 14. The transmission 14 in turn transfers the torque from engine 12 to an output member 26 in order to propel the vehicle 10 via a set of wheels 28, only one of which is shown in FIG. 1 for simplicity.

Exhaust system 48 is in fluid communication with the exhaust port 46 of engine 12, such that the exhaust system 48 receives and conditions a fluid in the form of a gaseous exhaust gas stream 22 as it passes in a gaseous or vapor fluidic state from the exhaust ports 46 of engine 12 through the exhaust system 48. The exhaust system 48 treats the exhaust gasses before the exhaust gas is released into the ambient atmosphere.

Exhaust system 48 may include an oxidation catalyst 30, a selective catalytic reduction (SCR) catalyst 32, and a diesel particulate filter (DPF) 34. Alternatively, an interior support surface of the DPF 34 may be wash coated, such as by applying a refractory oxide layer or SCR layer that bonds to the interior support surface for dispersion of catalytic metals. In a diesel embodiment of the engine 12, the exhaust system 48 may include a number of exhaust after-treatment devices configured to methodically remove from the exhaust gas flow 26 particulate matter (PM) or soot, i.e., largely carbonaceous byproducts and emission constituents of engine combustion. As shown, the exhaust system 48 includes a diesel oxidation catalyst (DOC) 30.

The primary function of the DOC 30 is reduction of carbon monoxides (CO) and non-methane hydrocarbons (NMHC). Additionally, the DOC 30 may be configured to generate nitrogen dioxide ($NO_2$) to be treated by the SCR catalyst 32 that is arranged downstream of the DOC 30. The DOC 30 typically contains a catalyst substance made up of precious metals, such as platinum and/or palladium, which function therein to accomplish the above-noted objectives. Generally, with respect to generation of $NO_2$, the DOC 30 becomes activated and reaches operating efficiency at elevated temperatures.

The SCR catalyst 32, on the other hand, is configured to convert NOx into diatomic nitrogen ($N_2$) and water ($H_2O$)

with the aid of the $NO_2$ generated by the DOC 30. A gaseous reductant, typically anhydrous ammonia, aqueous ammonia or urea, is added to a stream of exhaust gas and is absorbed onto the SCR catalyst 32. An inner surface of the SCR catalyst 32 may further include a wash coat that serves to attract the gaseous reductant such that the gaseous reductant may interact with the exhaust gas stream 22 the presence of NO and $NO_2$, and generate a chemical reaction to reduce NOx emissions from the engine 12.

After the SCR catalyst 32, the exhaust gas stream 22 proceeds to the DPF 34. In one embodiment of the disclosure, the DPF 34 may be arranged in tandem with and downstream of a second DOC and may be housed inside a single canister 42 such that the second DOC is configured to oxidize hydrocarbons and carbon monoxide present in the exhaust gas stream 22 into carbon dioxide ($CO_2$) and water. Although, as shown, the SCR catalyst 32 is positioned upstream of the DPF 34, the SCR catalyst 32 may also be positioned downstream of the DPF 34 without affecting the effectiveness of the exhaust system 48.

The DPF 34 is configured to collect and dispose of the particulate matter emitted by the engine 12 prior to the exhaust gas stream 22 being discharged to the ambient atmosphere. Accordingly, the DPF 34 acts as a trap for removing the particulate matter, specifically, soot, from the exhaust flow. Similar to the DOC 30 described above, the DPF 34 and second DOC typically contain precious metals, such as platinum and/or palladium, which function as catalysts in the subject devices to accomplish their respective objectives. After passing through the DPF 34, the exhaust gas stream 22 is deemed to be sufficiently cleaned of the noxious particulate matter and may then be allowed to exit the exhaust system 48 to the ambient atmosphere.

The term "condition" as employed above refers to temperature control and/or control of the exhaust gas stream 22 at various positions within the exhaust system 48. A fuel injection device 36 is in electronic communication with controller 40 via control signals 38, and is in fluid communication with the fuel tank 18. Fuel injection device 36 selectively injects fuel 16 into the exhaust gas stream 22 entering the DOC 30 and/or the DPF 34 as determined by the controller 40. Fuel 16 injected into the exhaust gas stream 22 prior to the DOC 30 is burned therein in a controlled manner to generate heat sufficient for regenerating the DPF 34.

The DOC 30 acts in the presence of a controlled temperature of exhaust gas stream 22 to oxidize or burn any hydrocarbons that are introduced into the exhaust stream. It is also understood that the DOC 30 may include zeolite content that may enable storage of increased amounts of hydrocarbons in the DOC 30 for cold start conditions as will be described in greater detail below. This provides a sufficient temperature level in the DPF 34 for oxidizing particulate matter which has been trapped by the filter downstream of the DOC 30. The DPF 34 is thus kept relatively free of potentially-clogging particulate matter.

The DPF 34 must be regenerated or cleaned after some particular amount of carbon-based soot is accumulated thereon to burn off the collected particulates. Regeneration of an exhaust after-treatment device of the exhaust system 48 may, for example, be commenced after a specific mass flow of air has been consumed by the engine 12 for combustion over a period of time. Generally, such regeneration may be accomplished using high temperature exhaust gas flow 22 to burn off the accumulated particles. The DPF 34 may be regenerated via fuel being injected directly into the exhaust gas stream 22 upstream of the DPF 34 and then having the injected fuel ignited at an appropriate instance.

In one embodiment of the disclosure, a regeneration process may occur when the controller 40 instructs the injection of an amount of fuel into the exhaust gas flow 22 upstream of the DOC 30 in order to superheat the exhaust gas flow and generate a warm-up of the DOC 30. The controller 40 may commence a regeneration cycle "n" and a subsequent cycle "n+1" according to a schedule programmed into the controller 40 or based on assessed operation of the engine 12 and the exhaust system 48.

The controller 40 performs engine system diagnostics and monitors the ongoing operation of exhaust system 48 to ensure efficient hydrocarbon conversion. For example, the controller 40 monitors and evaluates operation of the DOC 30. Controller 40 calculates an actual conversion efficiency of the exhaust system 48, and uses this result to calculate actual hydrocarbon emissions from the exhaust system and determine whether the DOC 30 is operating within acceptable ranges. Controller 40 can then compare the results to a calibrated amount or other threshold and execute a control action to reflect the result as will be described in greater detail below.

The controller 40 may be in communication with an engine coolant sensor 42 that generates a temperature signal 11 based upon a temperature detected for the coolant fluid in the engine. The controller 40 may also receive a temperature signal 11 from an air temperature sensor that detects ambient temperature conditions for the environment in which the vehicle operates.

Controller 40 receives temperature signals 11 from various temperature sensors 42 positioned to measure exhaust temperatures at different locations within the exhaust system 48, including, but not limited to, directly upstream of the DOC 30, directly downstream of the DOC 30, upstream and downstream of the SCR catalyst 32 and directly upstream of the DPF 34. In one embodiment, a temperature sensor 42 is positioned in proximity to the engine 12 or the inlet side of the DOC 30 to measure or detect an inlet temperature into the DOC 30.

Additional temperature sensors 42 may detect a corresponding outlet temperature from the DOC 30, an inlet temperature to the SCR catalyst 32, and an outlet temperature from the SCR catalyst 32, an inlet temperature to the DPF 34, and an outlet temperature from the DPF 34. The temperature signals 11 are each transmitted by or relayed from the temperature sensors 42 to the controller 40. Controller 40 is also in communication with the engine 12 to receive feedback signals 44 that measures a variety of operating points of engine 12, such as the throttle position, engine speed, accelerator pedal position, fueling quantity, requested engine torque, among a variety of operating points.

Figure 2:
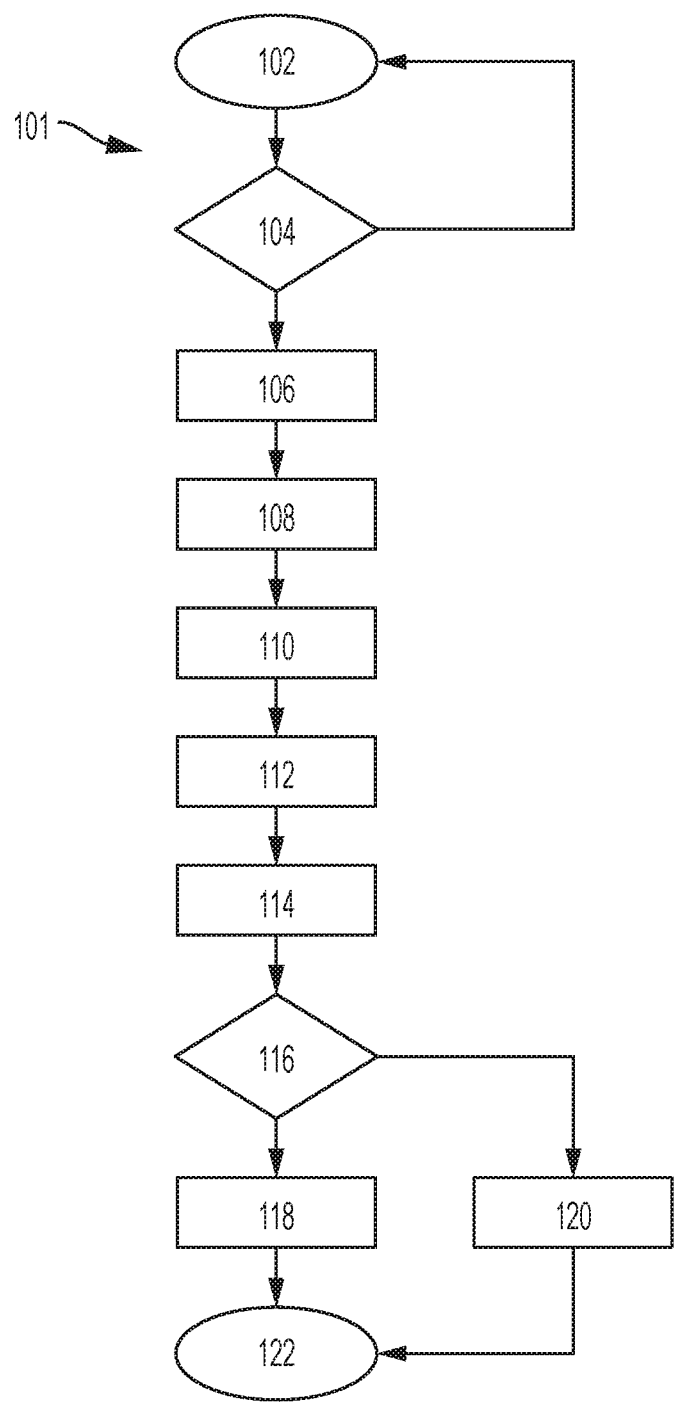
FIG. 2 is a flowchart describing a method for monitoring and diagnosing the state of the oxidation catalyst of the exhaust system of the vehicle shown in FIG. 1.

Referring now to FIG. 2, the diagnostic control system or diagnostic algorithm 100 may be executed by controller 40 to evaluate the efficiency of the DOC 30. In one embodiment of the disclosure, the controller 40 may evaluate the efficiency of the DOC 30 when predetermined engine and environmental conditions are present. For example, the controller 40 may evaluate the conversion efficiency of the DOC 30 during an exhaust system regeneration process to identify a variance in the measured conversion efficiency that may affect conversion efficiency separation.

Figure 3:
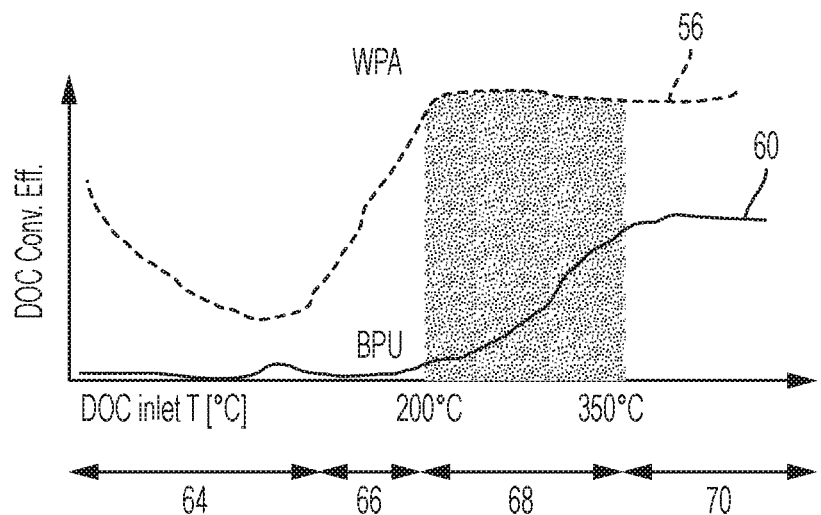
FIG. 3 is a graphical illustration of conversion efficiency of the oxidation catalyst of the exhaust system as a function of the temperature at the inlet of the oxidation catalyst.
Figure 4:
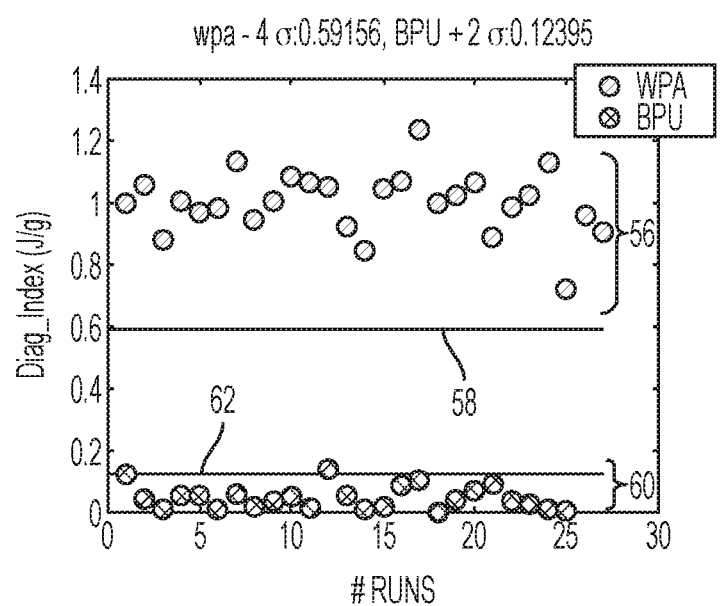
FIG. 4 is a graphical illustration of a correlated conversion efficiency of the oxidation catalyst utilizing the system and method of the present disclosure.

Conversion efficiency separation refers to a difference in efficiency between a worst performing acceptable (WPA) or least acceptable conversion efficiency of the DOC 30, and a best performing unacceptable (BPU) or maximum unacceptable conversion efficiency of the DOC 30. As is shown in FIGS. 3 and 4, the difference in conversion efficiency may be between one or more of a WPA efficiency distribution represented by data points 56 above a predefined WPA limit 58 and a BPU efficiency distribution represented by data points 60 below a predefined BPU limit 62, a 2σ (2 sigma) point of the BPU distribution and a 4σ point of the WPA distribution and/or mean values of the WPA and BPU efficiency distributions. The conversion efficiency separation between the WPA and BPU efficiency distributions may be relevant for diagnostic system robustness.

The smaller the conversion efficiency separation, the less likely that a WPA DOC 30 passes and/or a BPU DOC 30 fails an efficiency test. The decreased conversion efficiency separation may affect predictions of expected efficiency for a WPA DOC 30, which may reduce the conversion efficiency separation. The diagnostic control system 100 may evaluate the efficiency of the oxidation catalyst and to verify proper operation of the DOC 30.

In one embodiment of the disclosure, the diagnostic control system 100 may evaluate the efficiency of the DOC 30 when predetermined engine and environmental conditions are present. For example, as is shown in FIG. 3, area referenced by numeral 64 represents a temperature range between about 0 degrees Celsius to about 150 degrees Celsius whereas a second temperature range referenced by numeral 66 represents a temperature range about 150 degrees Celsius to about 200 degrees Celsius.

A cold phase of the regeneration process as will be described in greater detail below is represented by numeral 68 defined between about 200 degrees Celsius and about 350 degrees Celsius. It is understood that a variety of temperature ranges may be implemented to accommodate a variety of catalyst hardware and on-board diagnostic (OBD) emissions limits for use with the system and method of the present disclosure. Numeral 70 represent a warm-up and steady state phase temperature window for the regeneration process, wherein the temperature may range between about 350 degrees Celsius and 650 degrees Celsius.

Accordingly, a method of evaluating the efficiency of a DOC 30 using a diagnostic control system 100 is disclosed and generally referenced by numeral 101. Method 101 may begin at entry block 102, wherein the controller executes the diagnostic control system 100 to initiate the engine control diagnostic strategy to evaluate the efficiency of the DOC 30. Diagnostic control system 100 evaluates and determines the operating state and/or condition of the engine 12 and the exhaust system 48 of the vehicle at step or block 104 and determine if the vehicle and engine are in condition or suited to conduct an exhaust system regeneration process for the DPF.

As shown in FIG. 2, if the engine 12 is not in condition for a DPF regeneration process as detected at step 104, the method 101 of the diagnostic control system 100 will return to entry block 102. Alternatively, should the controller 40 detect that the engine is prepared for the regeneration process, the diagnostic control system 100 may implement an engine combustion mode to create a cold phase of a regeneration process at step 106. It is also understood that the regeneration process may by initiated without implementation of the cold phase combustion process if the DOC inlet exhaust temperature is between about 200 degrees Celsius and about 350 degrees Celsius While it is understood that a regeneration process cold phase may be defined by a variety of factors and conditions, for purposes of this disclosure, a cold phase of a regeneration process may exist where the temperature from the exhaust gas stream from the engine entering the inlet of the DOC 30 is between about 200 degrees Celsius and about 350 degrees Celsius as represented by line, shaded area and numeral 68 in FIG. 3.

The reduced inlet temperature may be generated by adjusting a variety of engine operating parameters, including, but not limited to, reducing intake throttling, increased air mass, adjusting fuel injection timing, reducing or terminating fuel injections and the like to reduce the exhaust temperature entering the inlet of the DOC 30. The diagnostic control system 100 monitors inlet and outlet temperatures of the DOC 30 during the cold phase of the regeneration process via the temperature sensors 42, which may include first and second temperature probe sensors in communication with the controller 40 as will be described in greater detail below.

At step 108, the controller 40 may be programmed to perform a diagnostic procedure to determine the conversion efficiency of the DOC 30. In one embodiment of the disclosure, the controller generates a diagnostic index value (Diag_Index) that represents the conversion efficiency of the DOC 30. The diagnostic index is generated based upon a ratio between the heat released during the regeneration process and the amount of post injection fuel released in the time period or duration of the regeneration process as is represented by the equation below:

$$\text{Diag\_Index} = \frac{\int_{t1}^{t2} dQ_{oxy}}{\int_{0}^{FuelMax} dq_{postInj}} = \frac{\text{Heat Released During } DPF\ Rgn \text{ Window}}{\text{Post } Inj \text{ Fuel released within same window}}$$

The heat release value may be calculated as the product of exhaust gas mass flow rate and the difference between the DOC outlet temperature sensor and an inert thermal model temperature 50 stored in the diagnostic control system 100. It is understood that the heat release value calculation may be aborted if the duration of integration is too short or too long as it may be difficult to recognize an exothermic hydrocarbon reaction if the acceleration is too fast. Additionally, the heat release value calculation may be aborted if the stored level of hydrocarbons in the DOC 30 is too high as compared to a predetermined hydrocarbon limit stored by controller 40.

It is contemplated that a small amount of post injection from the fuel injection device 36 may be used to initiate the startup procedure to increase the level of hydrocarbons stored in the DOC 30. The post injection is placed into the exhaust gas stream 22 and is input as a fixed amount of fuel and can either be used all the way to the end of an integration period or may be limited by a cumulative amount of hydrocarbons.

At step 110, in order to assess the conversion efficiency at the DOC 30, the diagnostic control system 100 gathers temperature data from the first and second temperature sensors 42 to identify an offset value to determine the difference between the two sensor readings changes for a duration. For example, the second temperature sensor 42 may measure the temperature at the outlet of the DOC 30 ($T_{DOCout}$) while the first temperature sensor measures temperature and the inlet of the DOC ($T_{DOCin}$) in a defined monitor period of time.

The diagnostic control system 100 may also compare the assessed temperature rate increase at the DOC 30 with stored reference warm-up rates of the DOC 30. The stored reference warm-up rates of the DOC 30 may be calculated empirically and correlated to an amount of the catalyst substance available or active in the DOC 30 for oxidizing hydrocarbons and carbon monoxide into carbon dioxide and water.

At step 112, the diagnostic control system 100 correlates the calculated diagnostic index (Diag_Index) against the detected operating conditions of the engine to determine a second diagnostic index value and identify a corrected oxidation catalyst efficiency value. The efficiency values may include least acceptable efficiency WPA values. The WPA values may include calibrated values predetermined and stored in the memory and/or values generated during conversion efficiency monitoring. The average efficiency values may be generated based on tables, equations, and/or efficiency models of the DOC 30.

In one embodiment of the disclosure at step 114, an efficiency validation module of the diagnostic control module 100 may determine the threshold efficiency value based on a function of modeled efficiency (desired or expected efficiency) and the calibratable offset value. The modeled efficiency refers to the expected efficiency of a DOC 30 throughout the life of the DOC 30. The modeled efficiency may include efficiency values for the DOC 30 corresponding to usage or age (e.g., efficiency values over 0-120,000 miles of operation on a vehicle).

The calibratable offset value may be predetermined, stored and determined based on a WPA/BPU distribution. The efficiency validation module may select a calibratable offset value based on stored maps. Maps relating calibratable offset values to WPA/BPU distribution values may be stored in the memory of the diagnostic control module 100 and used to select the calibratable offset value. The modeled efficiency, the calibratable offset value, and the WPA/BPU distribution may be predetermined during calibration and stored in the memory.

The WPA/BPU distribution includes a WPA distribution and a BPU distribution. Conversion efficiency separation may be determined based a difference between a $2\sigma$ (2 sigma) point of the BPU distribution and a $4\sigma$ (4 sigma) point of the WPA distribution. The $2\sigma$ (2 sigma) point may be greater than a mean of the BPU distribution. The $4\sigma$ (4 sigma) point may be less than a mean of the WPA distribution. The larger the conversion efficiency separation, the less likely that a false indication of a DOC 30 failing a conversion efficiency test occurs.

Although $2\sigma$ (2 sigma) and $4\sigma$ (4 sigma) points are described, the conversion efficiency separation may be based on other standard deviation points. The standard deviation points may refer to empirical data that is used to determine the calibratable offset value. Also, the conversion efficiency separation may alternatively be determined based on: a difference between the mean values of the WPA distribution and the BPU distribution; a distance between the WPA distribution and the BPU distribution; etc.

The calibratable offset value may be selected as a value between a WPA distribution and a BPU distribution, between the $2\sigma$ (2 sigma) and $4\sigma$ (4 sigma) points, or between other standard deviation points when setting the efficiency threshold. As an example, the threshold efficiency may be selected within a predetermined range of the $2\sigma$ (2 sigma) point. The DOC 30 may pass a conversion efficiency test when the actual conversion efficiency is greater than the threshold efficiency and/or one of the average efficiency values. The DOC 30 may fail a conversion efficiency test when the actual conversion efficiency is less than or equal to the threshold efficiency and/or one of the average efficiency values, such as below the mean of $\sigma$ (2 sigma) threshold for the BPU distribution.

As another example, the DOC 30 may pass a conversion efficiency test when the actual conversion efficiency is greater than the $4\sigma$ (4 sigma) point of the WPA distribution. The DOC 30 may fail a conversion efficiency test, for example, when the actual conversion efficiency is less than or below the $2\sigma$ (2 sigma) of the BPU distribution.

At step 116, an efficiency validation module determines whether the DOC 30 and/or the actual conversion efficiency passed. Task 120 may be performed when the DOC 30 and/or the actual conversion efficiency failed. Task 118 may be performed when the DOC 30 and/or the actual conversion efficiency passed.

At 120, a countermeasure may be performed when the validation signal indicates the DOC 30 failed the conversion efficiency test. The countermeasures may include, for example, limiting vehicle speed and/or engine speed and/or perform other remedial actions. The controller 40 may be configured to generate the signal indicative of the DOC 30 having failed, in the event that the amount of catalyst substance available in the DOC 30 has dropped below the threshold amount. The signal generated by the controller 40 may be designed to inform service personnel and/or operator of the vehicle 10 regarding the state of operating efficiency of the DOC 30. Furthermore, the signal may be a predetermined diagnostic numerical code, or a visual or audible display for service personnel and/or operator of the vehicle 10 that is indicative of the DOC 30 having failed. The method may end at step 122 after task 118 or task 120.

Controller 40 may be configured as a digital computer acting as a vehicle controller, and/or as a proportional-integral-derivative (PID) controller device having a microprocessor or central processing unit (CPU), read-only memory (ROM), random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Diagnostic control system or algorithm 100 and any required reference calibrations or look up tables are stored within or readily accessed by controller 40 to provide the functions described with reference to FIG. 2.

The controller 40 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
    an engine producing an exhaust gas;
    an exhaust system in fluid communication with the engine for treating the exhaust gas including an oxidation catalyst and a particulate filter, wherein the particulate filter is configured to regenerate when the exhaust gas is heated above a regeneration temperature;
    at least one temperature sensor for measuring a temperature of the exhaust gas; and
    a diagnostic control system including a controller operatively connected to the engine, exhaust system and at least one temperature sensor operable to:
        determine an operating state of at least one of the engine and exhaust system,
        initiate a particulate filter regeneration process in response to the detected operating state,
        define a first diagnostic index value by calculating a ratio of a heat release value to an amount of post injection fuel released in a time period of the particulate filter regeneration process,
        identify an offset value based upon temperature of the exhaust gas in the particulate filter regeneration process time period with the at least one temperature sensor,
        define a second diagnostic index value by calculating a ratio of the first diagnostic index value and the offset value, and
        evaluate the second diagnostic index value with an oxidation catalyst efficiency validation module to determine the efficiency of the oxidation catalyst.

2. The vehicle of claim 1 wherein the at least one temperature sensor further comprises a first temperature sensor disposed proximate an inlet of the oxidation catalyst configured to measure the exhaust gas temperature upstream of the oxidation catalyst and a second temperature sensor disposed proximate an outlet of the oxidation catalyst configured to measure the exhaust gas temperature downstream of the oxidation catalyst.

3. The vehicle of claim 1 wherein the controller of the diagnostic control system is operable to calculate the heat release value by:
    determining one or more parameters of the oxidation catalyst,
    determining an exhaust gas mass flow rate into the oxidation catalyst,
    calculating a catalyst value from the product of the exhaust gas mass flow rate and the difference between the exhaust gas temperature downstream of the oxidation catalyst and an inert temperature, and
    integrating the catalyst value to determine the heat release value.

4. The vehicle of claim 3 wherein the controller evaluates an inert catalyst temperature model to determine the inert temperature used to calculate the specific heat value of the oxidation catalyst.

5. The vehicle of claim 3 wherein the controller integrates the catalyst value wherein a lower limit of the time interval is a first time at which exhaust gas downstream of the oxidation catalyst reaches a first temperature, and an upper limit of the time interval is a second time at which exhaust gas downstream of the oxidation catalyst reaches a second temperature that is higher than the first temperature.

6. The vehicle of claim 1 wherein the oxidation catalyst efficiency validation module of the controller is configured to compare the second diagnostic index value with at least one of a preset threshold worst possible acceptable (WPA) value and preset threshold best possible unacceptable (BPU) value.

7. The vehicle of claim 6 wherein the controller of the diagnostic control system is operable to identify whether the oxidation catalyst is considered faulty when the second diagnostic index value is below the preset threshold best possible unacceptable (BPU) value.

8. The vehicle of claim 1 wherein the diagnostic control system initiates the particulate filter regeneration process when the exhaust gas temperature at the inlet of the oxidation catalyst is measured between about 200 degrees Celsius and about 350 degrees Celsius.

9. The vehicle of claim 1 wherein the exhaust system further comprises a selective catalytic reduction catalyst.

10. A method for use aboard a vehicle having an engine generating an exhaust gas, an exhaust system in fluid communication with the engine including an oxidation catalyst, a particulate filter and a diagnostic control system including a controller and at least one temperature sensor disposed proximate the oxidation catalyst in communication with the controller, the method comprising:
    using the controller to determine an operating state of at least one of the engine and exhaust system,
    initiating a particulate filter regeneration process in response to the detected operating state;

calculating a ratio of a heat release value to an amount of post injection fuel released in a time period of the particulate filter regeneration process to define a first diagnostic index value;

determining an offset value based upon temperature of the exhaust gas in the particulate filter regeneration process time period measured with the at least one temperature sensor;

calculating a ratio of the first diagnostic index value and the offset value to define a second diagnostic index value; and using an oxidation catalyst efficiency validation module of the controller to evaluate the second diagnostic index value to determine the efficiency of the oxidation catalyst.

11. The method of claim 10 wherein step of determining an offset value with the at least one temperature sensor further comprises:

using a first temperature sensor disposed proximate an inlet of the oxidation catalyst configured to measure the exhaust gas temperature upstream of the oxidation catalyst; and using a second temperature sensor disposed proximate an outlet of the oxidation catalyst configured to measure the exhaust gas temperature downstream of the oxidation catalyst.

12. The method of claim 10 wherein the step of calculating the heat release value for the first diagnostic index value further comprises:

determining one or more parameters of the oxidation catalyst;

determining an exhaust gas mass flow rate into the oxidation catalyst;

calculating a catalyst value from the product of the exhaust gas mass flow rate and the difference between the exhaust gas temperature downstream of the oxidation catalyst and an inert temperature; and integrating the catalyst value to determine the heat release value.

13. The method of claim 11 further comprising the step of using the controller to evaluate an inert catalyst temperature model to determine the inert temperature used to calculate the specific heat value of the oxidation catalyst.

14. The method of claim 10 wherein the step of using the oxidation catalyst efficiency validation module of the controller further comprises comparing the second diagnostic index value with at least one of a preset threshold worst possible acceptable (WPA) value and preset threshold best possible unacceptable (BPU) value.

15. The method of claim 14 further comprising the step of using the controller to identify whether the oxidation catalyst is considered faulty when the second diagnostic index value is below the preset threshold best possible unacceptable (BPU) value.

16. The method of claim 10 wherein the controller initiates the particulate filter regeneration process when the exhaust gas temperature at the inlet of the oxidation catalyst is measured between about 200 degrees Celsius and about 350 degrees Celsius.

17. A method of assessing efficiency of an oxidation catalyst of an exhaust system including a particulate filter for a vehicle, the method comprising:

providing a diagnostic control system including a controller and at least one temperature sensor in communication with the controller and disposed proximate the oxidation catalyst;

initiating a particulate filter regeneration process when the at least one temperature sensor measures exhaust gas temperature at the inlet of the oxidation catalyst between about 200 degrees Celsius and about 350 degrees Celsius;

calculating a ratio of a heat release value to an amount of post injection fuel released in a time period of the particulate filter regeneration process to define a first diagnostic index value;

determining an offset value based upon temperature of the exhaust gas in the particulate filter regeneration process time period measured with the at least one temperature sensor;

calculating a ratio of the first diagnostic index value and the offset value to define a second diagnostic index value; and evaluating the second diagnostic index value to determine the efficiency of the oxidation catalyst with an oxidation catalyst efficiency validation module of the controller.

18. The method of claim 17 wherein the at least one temperature sensor further comprises a first temperature sensor disposed proximate an inlet of the oxidation catalyst configured to measure the exhaust gas temperature upstream of the oxidation catalyst and a second temperature sensor disposed proximate an outlet of the oxidation catalyst configured to measure the exhaust gas temperature downstream of the oxidation catalyst.

19. The method of claim 17 wherein the step of calculating the heat release value for the first diagnostic index value further comprises:

determining one or more parameters of the oxidation catalyst;

determining an exhaust gas mass flow rate into the oxidation catalyst;

calculating a catalyst value from the product of the exhaust gas mass flow rate and the difference between the exhaust gas temperature downstream of the oxidation catalyst and an inert temperature; and integrating the catalyst value to determine the heat release value.

20. The method of claim 10 wherein the step of evaluating the second diagnostic index value with the oxidation catalyst efficiency validation module of the controller further comprises comparing the second diagnostic index value with at least one of a preset threshold worst possible acceptable (WPA) value and preset threshold best possible unacceptable (BPU) value, wherein the oxidation catalyst is considered faulty when the second diagnostic index value is below the preset threshold best possible unacceptable (BPU) value.

* * * * *